(12) United States Patent
Rhein (10) Patent No.: US 9,816,542 B2
(45) Date of Patent: Nov. 14, 2017

(54) ANCHORING DEVICE

(71) Applicant: A. RAYMOND ET CIE, Grenoble (FR)

(72) Inventor: Axel Rhein, Steinen (DE)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 14/916,043

(22) PCT Filed: Sep. 29, 2014

(86) PCT No.: PCT/EP2014/070784
§ 371 (c)(1),
(2) Date: Mar. 2, 2016

(87) PCT Pub. No.: WO2015/044417
PCT Pub. Date: Apr. 2, 2015

(65) Prior Publication Data
US 2016/0215809 A1    Jul. 28, 2016

(30) Foreign Application Priority Data
Sep. 30, 2013    (DE) .................. 10 2013 219 797

(51) Int. Cl.
*F16B 13/06* (2006.01)
*F16B 19/10* (2006.01)
*F16B 13/12* (2006.01)

(52) U.S. Cl.
CPC ........ *F16B 19/1081* (2013.01); *F16B 13/126* (2013.01)

(58) Field of Classification Search
CPC ...... F16B 13/06; F16B 13/066; F16B 13/122; F16B 13/126; F16B 19/1027; F16B 19/1081; F16B 19/109
(Continued)

(56) References Cited

U.S. PATENT DOCUMENTS 3,768,845 A    10/1973   Gilliland
5,704,752 A *  1/1998   Logerot .............. F16B 19/1081
                                                 403/248
(Continued)

FOREIGN PATENT DOCUMENTS

DE    20 2008 010 262    10/2008
DE    10 2011 108 298     1/2013
GB         2 443 197      4/2008

OTHER PUBLICATIONS

International Preliminary Report on Patentability dated Apr. 5, 2016 in PCT/EP2014/070784.
(Continued)

*Primary Examiner* — Roberta Delisle
(74) *Attorney, Agent, or Firm* — Faegre Baker Daniels LLP (57) ABSTRACT

An anchoring device has an insert sleeve and an expanding rivet. The insert sleeve is anchorable in an insert recess of a support part via engagement tongues. In a final assembly configuration, spreading arms of the expansion rivet are situated in arm clearances of the insert sleeve by the action of an expansion shank of a rivet pin, and are engaged with retaining edges of the insert sleeve. In this manner, the mounting part is removably connected to the support part with the expansion shank removable from the rivet body by releasing the spreading arms from the insert sleeve in order to release the connection.

13 Claims, 7 Drawing Sheets

(58) Field of Classification Search
USPC ......... 411/44, 45, 48, 57.1, 61, 65, 508–509
See application file for complete search history.

(56) References Cited

U.S. PATENT DOCUMENTS

| | | | | |
|---|---|---|---|---|
| 5,927,920 | A * | 7/1999 | Swanstrom | F16B 37/122 |
| | | | | 411/180 |
| 6,079,922 | A * | 6/2000 | Ross | F16B 13/122 |
| | | | | 411/180 |
| 6,481,942 | B2 * | 11/2002 | Tanaka | F16B 19/1081 |
| | | | | 411/41 |
| 6,910,840 | B2 * | 6/2005 | Anscher | F16B 19/1081 |
| | | | | 411/41 |
| 7,374,200 | B2 * | 5/2008 | Ikeda | B60R 21/213 |
| | | | | 280/728.2 |
| 7,413,367 | B2 * | 8/2008 | Hawang | F16B 19/1081 |
| | | | | 403/240 |
| 7,496,993 | B2 * | 3/2009 | Kosidlo | F16B 5/0621 |
| | | | | 24/295 |
| 2005/0220560 | A1 | 10/2005 | Shinozaki et al. | |
| 2008/0193250 | A1 * | 8/2008 | Boubtane | F16B 13/025 |
| | | | | 411/48 |
| 2009/0220299 | A1 | 9/2009 | Hawang | |
| 2009/0263210 | A1 | 10/2009 | Loewe et al. | |

OTHER PUBLICATIONS

International Search Report dated Feb. 17, 2015 in PCT International Application No. PCT/EP2014/070784.

* cited by examiner

ANCHORING DEVICE

CROSS-REFERENCE TO RELATED APPLICATION

This application is a U.S. National Phase Patent Application based on International Application Serial No. PCT/EP2014/070784 filed Sep. 29, 2014, the disclosure of which is hereby explicitly incorporated by reference herein.

BACKGROUND OF THE INVENTION

1. Field of the Invention

The present invention relates to an anchoring device.

2. Description of the Related Art

One anchoring device is known from U.S. Pat. No. 3,768,845. The previously known anchoring device has an insert sleeve with engagement tongues which are engageable with an inner wall of an insert recess which is formed in a support part, and the insert sleeve being equipped with retaining means. In addition, the previously known anchoring device has an insertion part which may be pushed into the insert sleeve in an insertion direction and which is blocked against displacement opposite the insertion direction by the retaining means. When the insertion part is pushed into the insert sleeve, the engagement tongues engage with the inner wall of the insert recess as the result of a radially outward motion, so that the insert sleeve is then anchored in the insert recess. The insertion part is designed as a cylindrical pin which, after being pushed into the insert sleeve with customary handling forces, undetachably engages with retaining tongues, as retaining means, which face radially inwardly in the insertion direction.

SUMMARY OF THE INVENTION

The present invention provides an anchoring device is characterized by ease of disassembly with very stable anchoring of the insert sleeve.

For the anchoring device according to the invention, as a result of the insertion part having a rivet body with at least one spreading arm which cooperate(s) with at least one retaining edge, the insertion part may be detachably and removably connected to the insert sleeve via the movement of the or each retaining arm, so that the anchoring device is once again removable from the insert recess if necessary.

In one form thereof, the present invention provides an anchoring device having an insert sleeve with engagement tongues which are engageable with an inner wall of an insert recess which is formed in a support part, and the insert sleeve being equipped with retaining means, and having an insertion part which may be pushed into the insert sleeve in an insertion direction and which is blocked against displacement opposite the insertion direction by the retaining means, characterized in that the insertion part has a rivet body that is equipped with at least one spreading arm, and that the retaining means are formed by at least one retaining edge which engages with the or each spreading arm.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

2

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DETAILED DESCRIPTION

Figure 1:
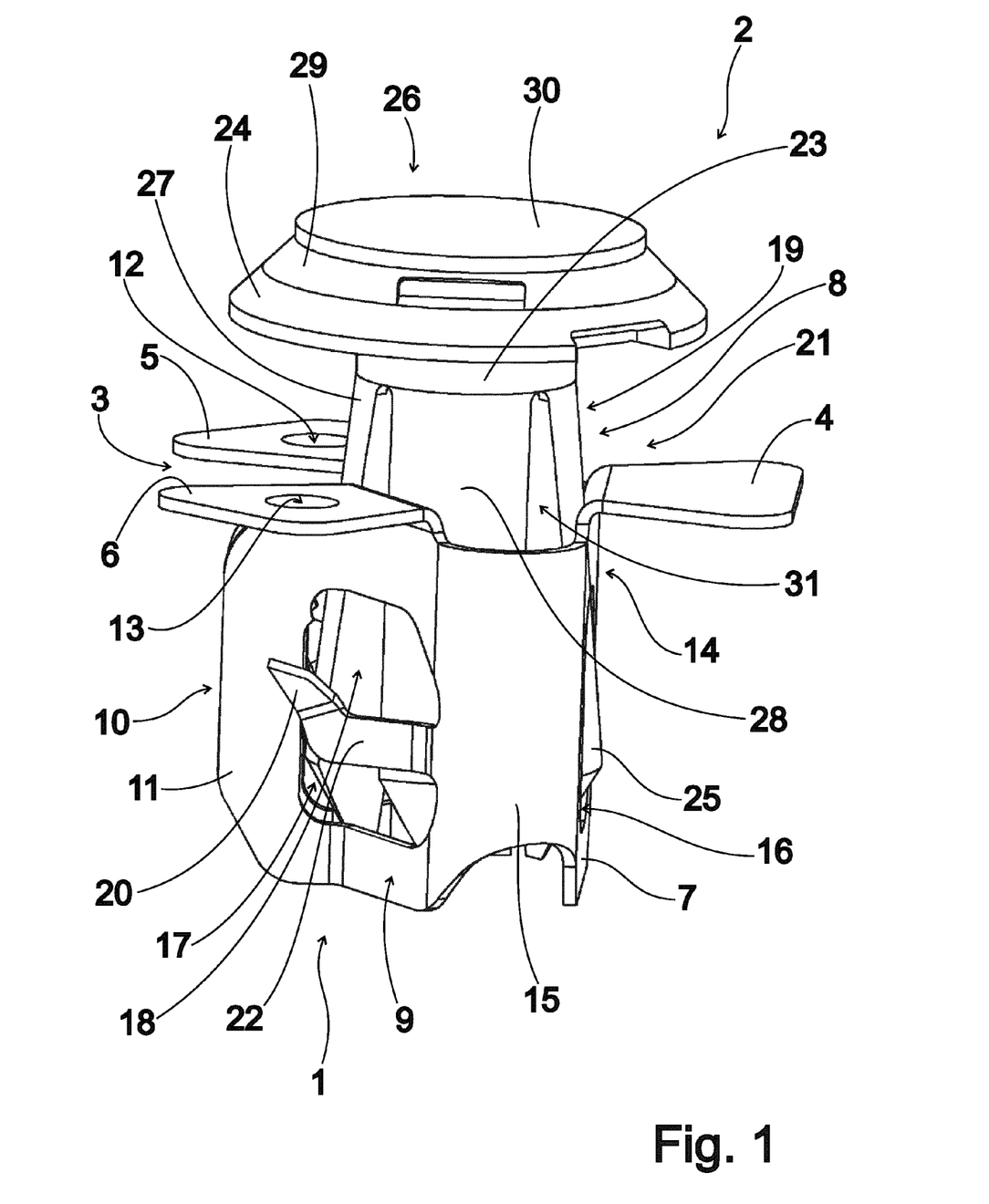
FIG. 1 shows, in a perspective view, one exemplary embodiment of an anchoring device according to the invention, having an insert sleeve and having an expansion rivet as an insertion part.

FIG. 1 shows, in a perspective view, one exemplary embodiment of an anchoring device according to the invention, having an insert sleeve 1 made of sheet metal as a punched-bent part, and having an expansion rivet 2, made of a hard elastic plastic material, as an insertion part.

The insert sleeve 1 has a closed ring-like shape, except for a circumferential gap 3, and extends in an axial direction. At an axial end on the head side, the insert sleeve 1 is provided with radially outwardly protruding support tongues 4, 5, 6 which are integrally formed on flat sections 7, 8, 9 having a substantially planar shape. The flat sections 8, 9 adjoining the circumferential gap 3 on the edge side have flared-out sections 10, 11 which adjoin the circumferential gap 3 and which are oriented at an angle radially outwardly with respect to the flat sections 8, 9 on the edge side. The support tongues 5, 6 integrally formed on the flat sections 8, 9 on the edge side are each provided with a disassembly recess 12, 13. The flat sections 8, 9 on the edge side are connected to the middle flat section 7, situated opposite from the circumferential gap 3, via radially outwardly curved connecting sections 14, 15.

An arm clearance 16, 17, 18 is formed in the flat sections 7, 8, 9, respectively, so that the insert sleeve 1 has ring structures which are open on the head side and the base side. An engagement tongue 19, 20 is formed on the flat section 8, 9, respectively, on the edge side, and is connected to the adjacent connecting section 14, 15 via a connecting web 21, 22, which extends in the circumferential direction and is joined to the respective engagement tongue 19, 20 in a relatively elastic manner. The engagement tongues 19, 20 are angled in the direction of the support tongues 5, 6 which are integrally formed on the corresponding flat section 8, 9 on the edge side, and are flared radially outwardly and are preferably pointed.

The expansion rivet 2 of the exemplary embodiment according to FIG. 1 has a rivet body 23 which bears a radially outwardly protruding head plate 24 on a head end. In the exemplary embodiment according to FIG. 1, four spreading arms 25, 26, 27, 28 which extend away from the head plate 24 in the axial direction are integrally formed on the head plate 24.

In modifications which are not illustrated, the rivet body 23 has two or three spreading arms.

In addition, the expansion rivet 2 according to FIG. 1 is equipped with a rivet pin 29 which has a cover plate 30, and an expansion shank 31 which is integrally formed on the cover plate 30 and extends in the axial direction.

In the arrangement according to FIG. 1, the rivet pin 29 is completely pushed into the rivet body 23, so that due to the action of the expansion shank 31 on the spreading arms 25, 26, 27, 28, the spreading arms are flared radially outwardly, and in the inserted configuration of the expansion rivet 2 which is pushed into the insert sleeve 1 in FIG. 1, the spreading arms enter into the arm clearances 16, 17, 18 or into the circumferential gap 3.

Figure 2:
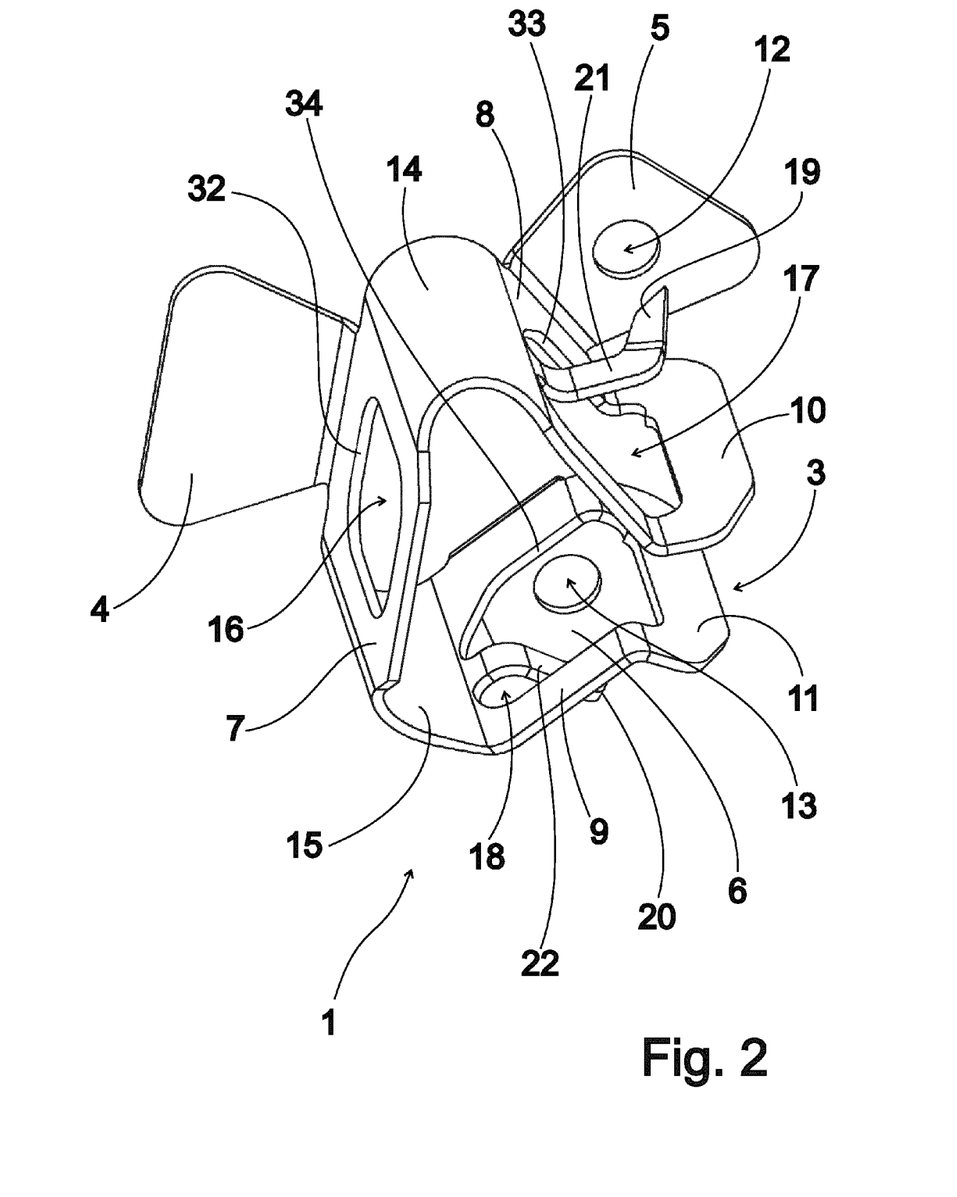
FIG. 2 shows, in a perspective view, the insert sleeve of the exemplary embodiment according to FIG. 1.

FIG. 2 shows, in a perspective view, the insert sleeve 1 of the exemplary embodiment according to FIG. 1. The design of the insert sleeve 1, which is closed in a ring shape except for the circumferential gap 3, and its basic triangle-like shape in cross section due to the flat sections 7, 8, 9 in this exemplary embodiment, are particularly clearly apparent from FIG. 2. Furthermore, it is particularly clearly apparent in the illustration according to FIG. 2 that on the ring structure on the head side, a retaining edge 32, 33, 34 is formed as a retaining means in each case on the arm clearances 16, 17, 18 on their side facing the respective support tongue 4, 5, 6.

Figure 3:
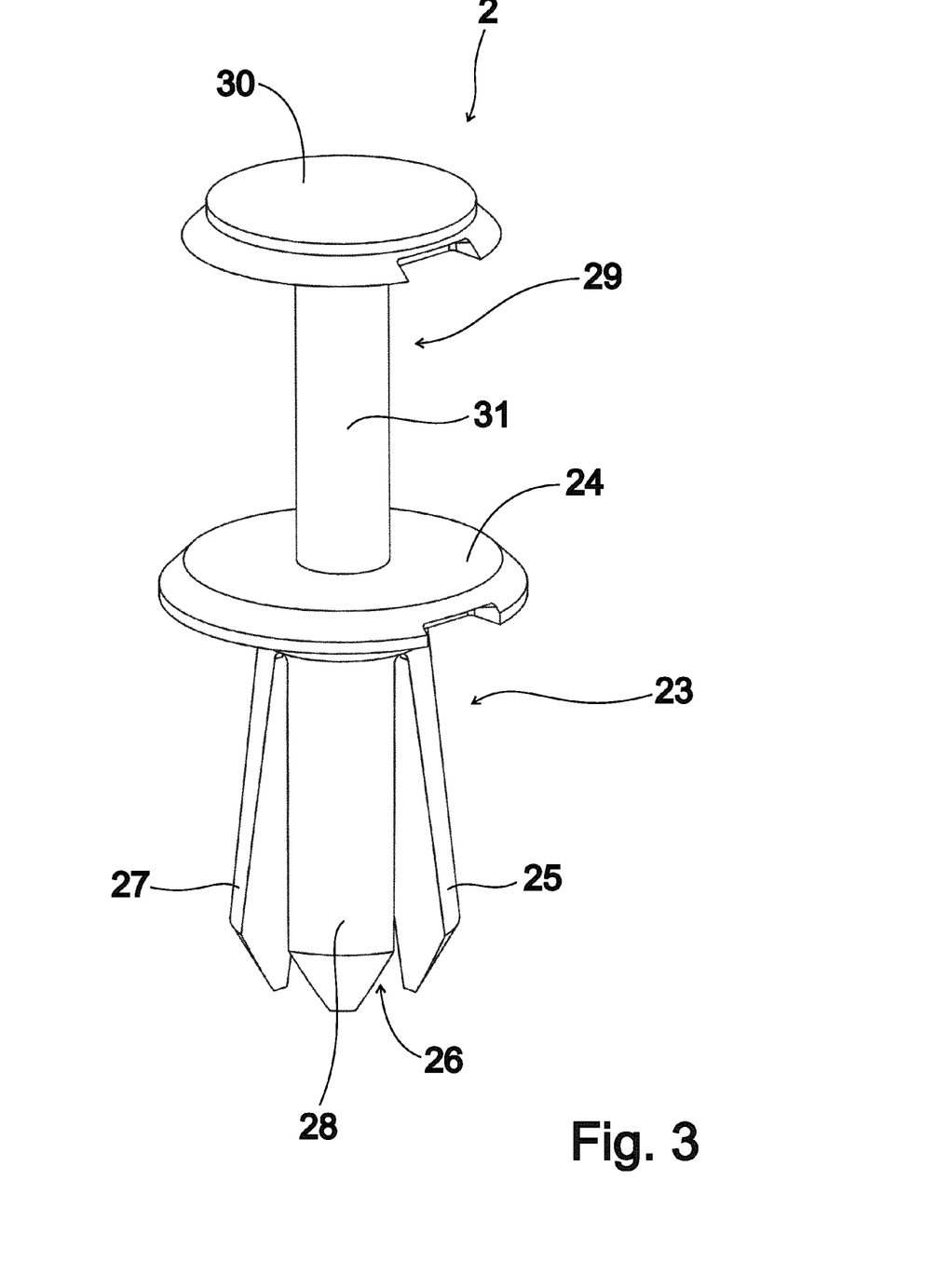
FIG. 3 shows, in a perspective view, the expansion rivet of the exemplary embodiment according to FIG. 1.

FIG. 3 shows, in a perspective view, the expansion rivet 2 of the exemplary embodiment according to FIG. 1, with the rivet pin 29 in a position that is only partially pushed into the rivet body 23. It is apparent from FIG. 3 that the spreading arms 25, 26, 27, 28 are radially inwardly tapered with a bevel on their free end facing away from the head plate 24 to ensure ease of insertion into the insert sleeve 1.

Figure 4:
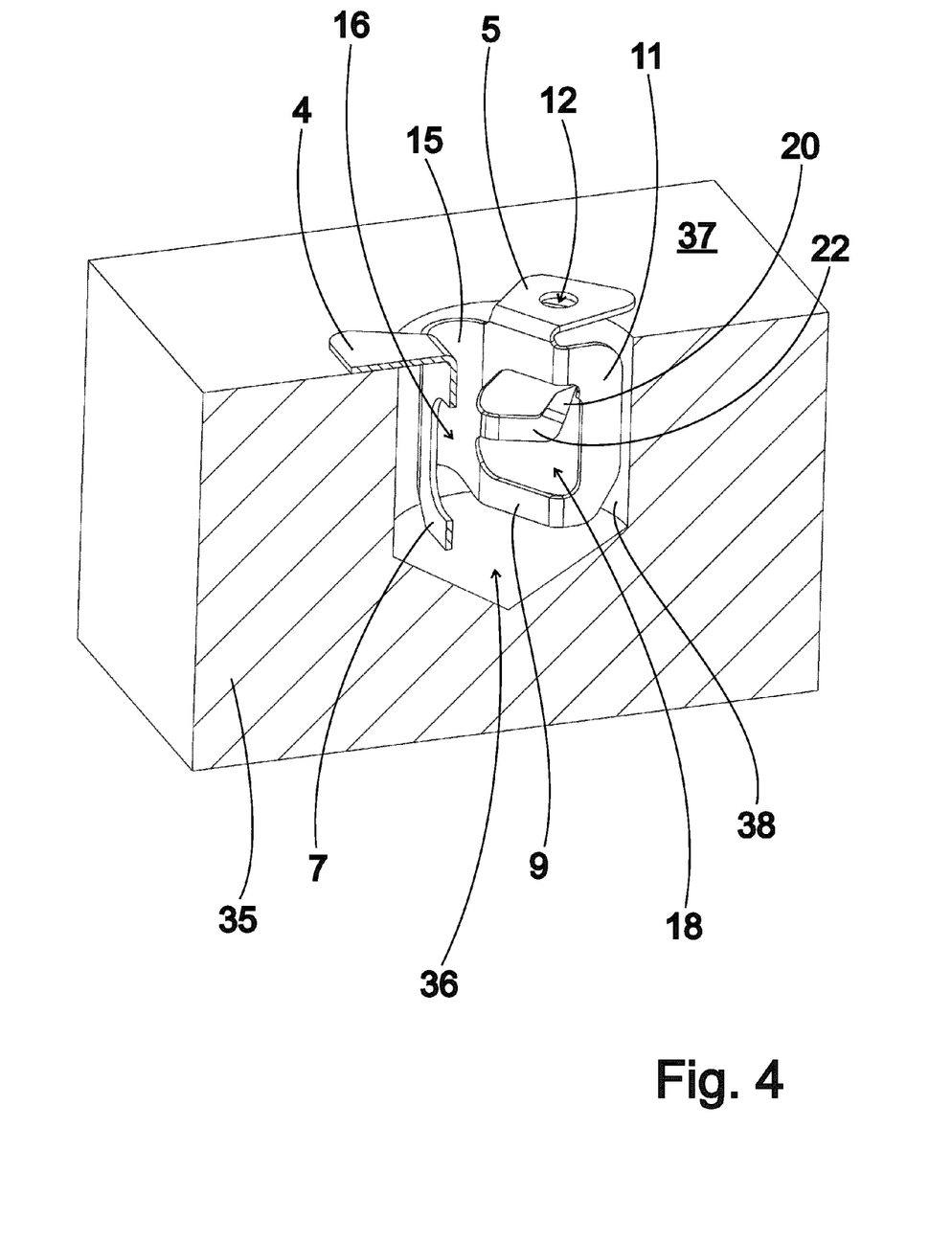
FIG. 4 shows, in a cutaway perspective view, a support part which is provided with an insert recess, together with an insert sleeve according to the exemplary embodiment of FIG. 1 which is inserted into the insert recess.

FIG. 4 shows, in a cutaway perspective view, a support part 35 which is provided with an insert recess 36. In the arrangement according to FIG. 4, the insert sleeve 1 according to the exemplary embodiment of FIG. 1 is inserted with pressing together of the flared-out sections 10, 11, so that the support tongues 4, 5, 6 rest on a top side 37 of the support part 35, and the engagement tongues 19, 20 are anchored in an inner wall 38 of the insert recess 36 for captive retention, after a relaxation of the insert sleeve 1, which is particularly effective due to the curved connecting sections 14, 15. The insert sleeve 1 is thus fixedly connected to the support part 35 in a detachable manner.

Figure 5:
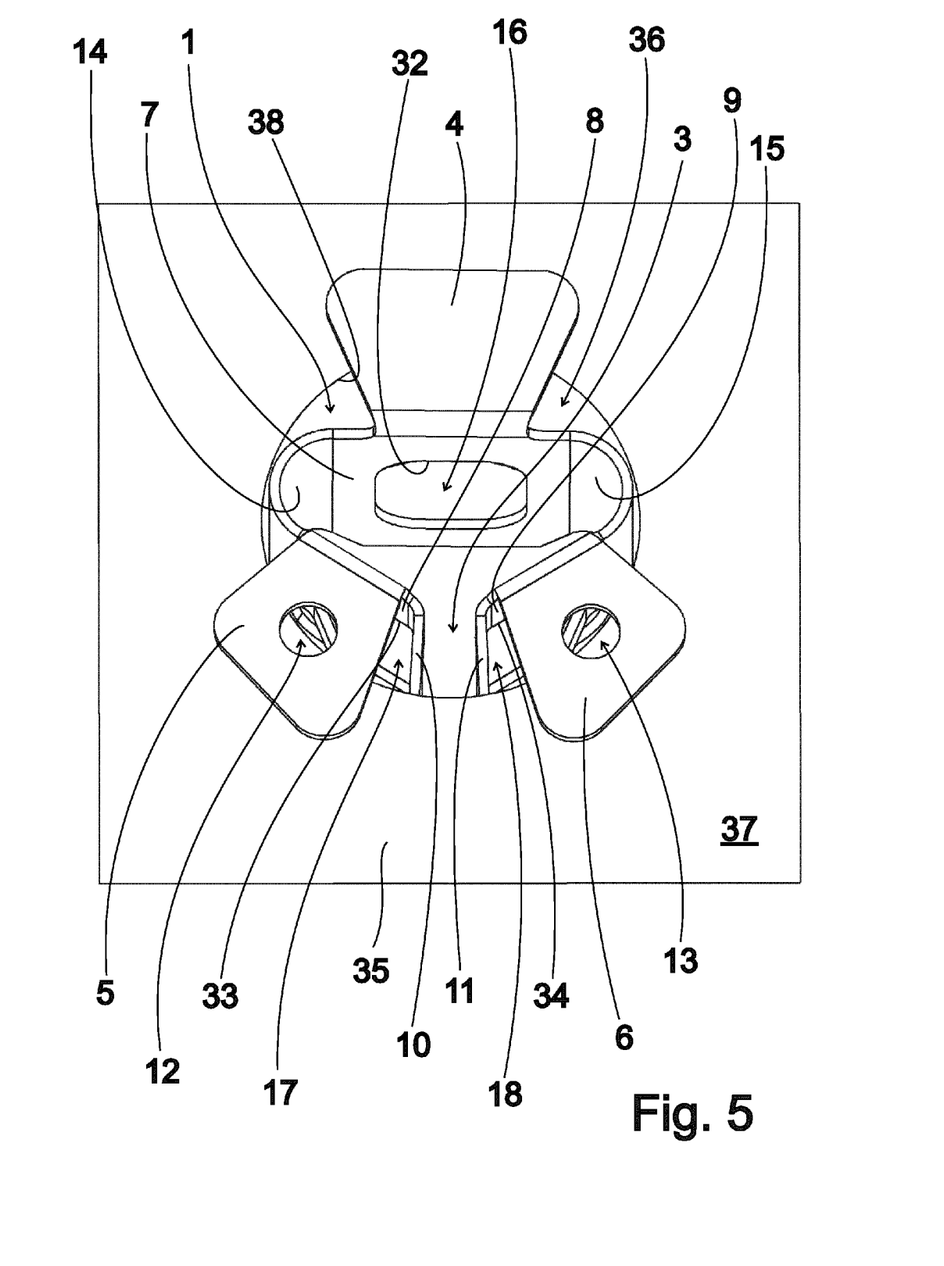
FIG. 5 shows, in a top view, the arrangement according to FIG. 4.

FIG. 5 shows, in a top view, the arrangement according to FIG. 4. It is apparent from the illustration according to FIG. 5 that good adaptability of the insert sleeve 1 is ensured, even at insert recesses 36 having a nonuniform design, due to line-type contact areas between the flared-out sections 10, 11 and the connecting sections 14, 15 and the inner wall 38 of the insert recess 36. The flat sections 7, 8, 9 are situated at a distance from the inner wall 38 with formation of a free space.

In addition, it is apparent from FIG. 5 that the cross section of the insert sleeve 1 may be reduced enough that it is removable from the insert recess 36 after releasing the engagement tongues 19, 20, for example by introducing a forceps-like disassembly tool into the disassembly recesses 12, 13 of the support tongues 5, 6 on the edge side, and closing the circumferential gap 3.

Figure 6:
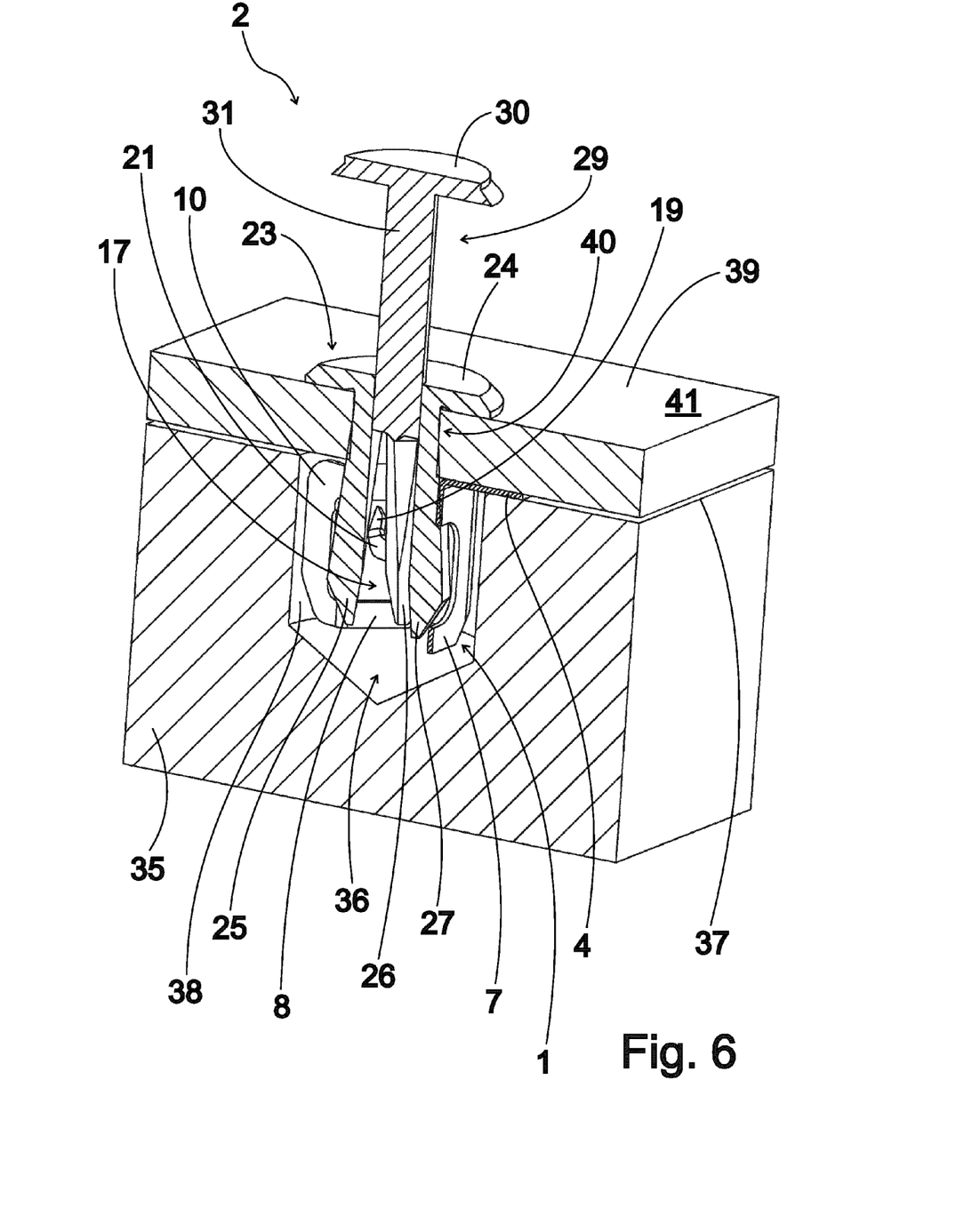
FIG. 6 shows, in a cutaway perspective view, the support part according to FIG. 4 with the insert sleeve situated in the insert recess, and a mounting part which is placed on the support part, with an expansion rivet pushed into the insert sleeve, in a preassembly configuration.

FIG. 6 shows, in a cutaway perspective view, the exemplary embodiment of an anchoring device according to the invention according to FIG. 1, with the insert sleeve 1 situated in the insert recess 36 of the support part 35 corresponding to the arrangement according to FIGS. 4 and 5, a mounting part 39 which is placed on the top side 37 of the support part 35, and the expansion rivet 2 in a preassembly configuration. In the preassembly configuration, the rivet body 23 is passed through an insertion recess 40 formed in the mounting part 39, and with the spreading arms 25, 26, 27, 28 is pushed into the insert sleeve 1 in such a way that three spreading arms 25, 26, 27 are situated in arm clearances 16, 17, 18 respectively, and the remaining spreading arm 28 rests in the circumferential gap 3 between the flared-out sections 10, 11, which are situated at a distance from one another in the circumferential direction. A reliable rear engagement of the spreading arms 25, 26, 27 resting in the arm clearances 16, 17, 18 is ensured due to the free space between the flat sections 7, 8, 9 and the inner wall 38. The head plate 24 of the rivet body 23 hereby rests on a top side 41 of the mounting part 39, while the support tongues 4, 5, 6 of the insert sleeve 1 are situated between the support part 35 and the mounting part 39.

Figure 7:
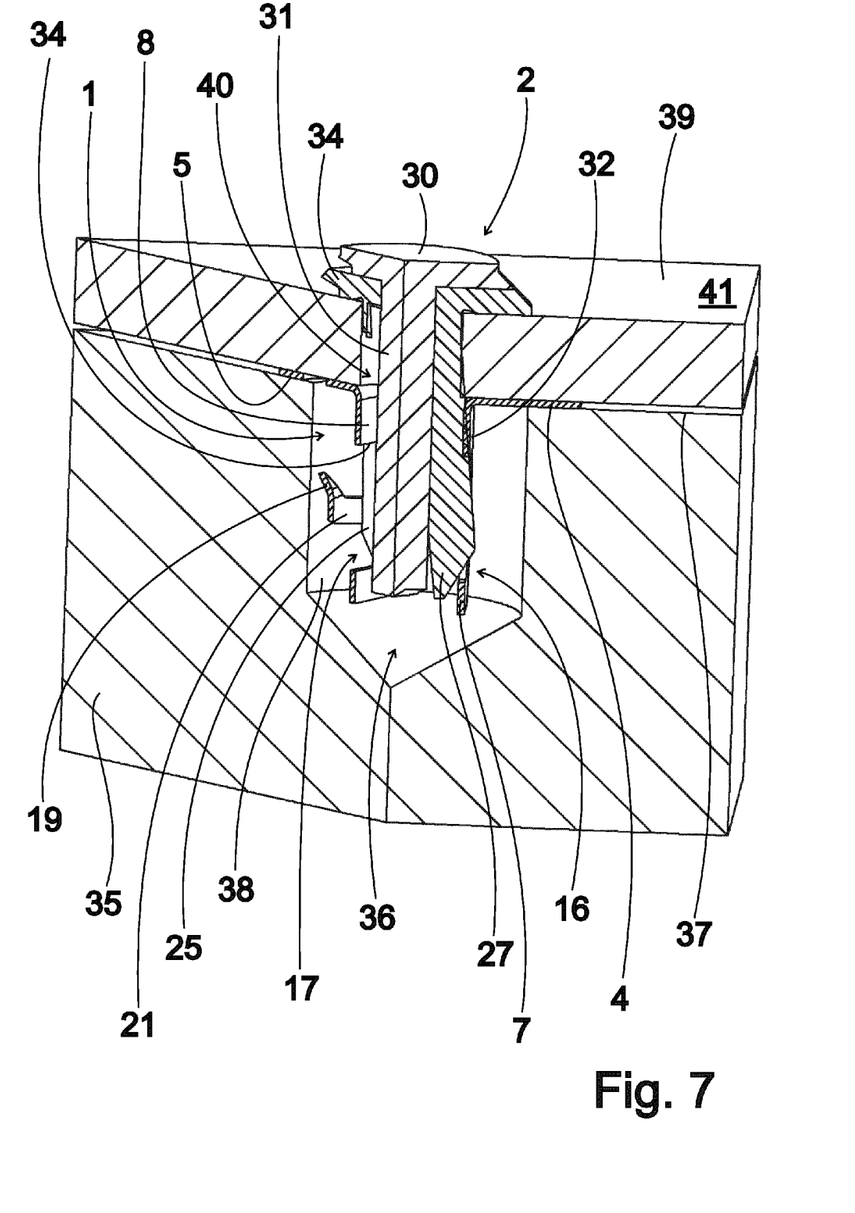
FIG. 7 shows, in a perspective view, the arrangement according to FIG. 6 with the expansion rivet in a final assembly configuration.

FIG. 7 shows, in a cutaway perspective view, the arrangement according to FIG. 6, with the rivet pin 29 of the expansion rivet 2 now in a final assembly configuration, pushed into the rivet body 23 in an insertion direction. It is clearly apparent from FIG. 7 that in the final assembly configuration, the cover plate 30 of the rivet pin 29 rests on the head plate 24 of the rivet body 23, and the expansion shank 31 of the rivet pin 29 radially outwardly braces the spreading arms 25, 26, 27, 28 of the rivet body 23. In the process, the retaining edges 32, 33, 34 dig into the spreading arms 25, 26, 27 situated in the arm clearances 16, 17, 18, and the engagement tongues 19, 20 dig further into the inner wall 38, so that the expansion rivet 2 is fixedly situated in the insert sleeve 1 in a detachable manner. The insert sleeve 1 is now likewise anchored very stably over its extent in the longitudinal direction.

After the rivet pin 29 is moved opposite the insertion direction, for example moved once again into the preassembly position according to FIG. 6, the spreading arms 25, 26, 27, 28 relax at least to a certain extent, so that the connection between the spreading arms 25, 26, 27 situated in the arm clearances 16, 17, 18 and the retaining edges 32, 33, 34 is loosened at least enough that the rivet body 23 is removable from the insert sleeve 1 with relatively little force, and the mounting part 39 is thus once again removable from the support part 35. The insert sleeve 1 may also be subsequently removed, if necessary, as explained in conjunction with FIG. 5.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:
1. An anchoring device, comprising:
an insert sleeve having engagement tongues engageable with an inner wall of an insert recess formed in a support part, the insert sleeve further including retaining members having respective retaining edges;

an insertion part including a rivet body having at least one spreading arm, each spreading arm engageable with a respective retaining edge of the retaining members, the insertion part insertable into the insert sleeve along an insertion direction, the insertion part blocked against displacement opposite the insertion direction by the retaining edges of the insert sleeve; and wherein the insert sleeve includes a plurality of flat sections, wherein pairs of the flat sections are connected to one another via radially outwardly curved connecting sections, and two of the flat sections include integrally formed, radially outwardly angled flared-out sections.

2. The anchoring device of claim 1, wherein the insertion part is an expansion rivet having a rivet pin insertable into the rivet body for spreading each spreading arm.

3. The anchoring device of claim 2, wherein the insert sleeve includes an arm clearance corresponding to each spreading arm into which a respective spreading arm is received when the rivet pin is inserted into the rivet body.

4. The anchoring device of claim 3, wherein each retaining edge is formed in a respective arm clearance of the insert sleeve.

5. The anchoring device of claim 2, wherein the rivet body includes at least two spreading arms.

6. The anchoring device of claim 2, wherein the insert sleeve includes at least one integrally formed, radially outwardly facing support tongue extending at a right angle to the axial direction.

7. The anchoring device of claim 1, wherein the rivet body includes at least two spreading arms.

8. The anchoring device of claim 7, wherein the insert sleeve includes an arm clearance corresponding to each spreading arm into which a respective spreading arm is received when the rivet pin is inserted into the rivet body.

9. The anchoring device of claim 7, wherein the insert sleeve includes at least one integrally formed, radially outwardly facing support tongue extending at a right angle to the axial direction.

10. The anchoring device of claim 1, wherein the insert sleeve includes at least one integrally formed, radially outwardly facing support tongue extending at a right angle to the axial direction.

11. The anchoring device of claim 10, wherein the engagement tongues are oriented at an angle radially outwardly with respect to the support tongues.

12. The anchoring device of claim 1, wherein each flat section includes an arm clearance.

13. The anchoring device of claim 1, wherein the insert sleeve is a punched and bent part made of sheet metal.

\* \* \* \* \*